United States Patent [19]

Costa Mas

[11] Patent Number: 4,681,198
[45] Date of Patent: Jul. 21, 1987

[54] INTEGRAL ACCELERATOR-BRAKE CONTROL FOR MOTORCYCLES

[76] Inventor: Miguel-Angel Costa Mas, San Joaquín, 19, Jalon (Alicante), Spain

[21] Appl. No.: 725,018

[22] Filed: Apr. 18, 1985

[30] Foreign Application Priority Data

Apr. 23, 1984 [ES] Spain .................................. 278.973

[51] Int. Cl.[4] ....................... B60K 41/20; G05G 9/02
[52] U.S. Cl. .................................. 192/3 S; 74/435; 74/471 R; 74/489; 74/501 R; 74/505
[58] Field of Search .................. 74/471 R, 489, 435, 74/505, 501 R; 192/3 S

[56] References Cited

U.S. PATENT DOCUMENTS 1,832,254 11/1931 Spanovic ........................ 74/471 R
4,286,699 9/1981 Pawelka ........................ 192/3 S X
4,352,303 10/1982 Christner ........................ 74/505 X

FOREIGN PATENT DOCUMENTS 1096783 1/1961 Fed. Rep. of Germany ........ 74/489
297650 6/1954 Switzerland ........................ 74/489

Primary Examiner—Allan D. Herrmann
Attorney, Agent, or Firm—McGlew and Tuttle

[57] ABSTRACT

Integral accelerator-brake control for motorcycles, characterized in that the handle grip which is rotatable, is provided with an anatomically shaped radial extension to act as a lever aid for the turning of the handle grip, and has a conical end including a section having teeth along approximately one-third of its perimeter, the remainder being smooth, while tangentially and diametrically opposite, there are two additional toothed sectors, carried by corresponding cylinders, having axes of rotation perpendicular to that of the handle grip, to each of which cylinders correspondingly the accelerator operating cable and the brake operating cable, respectively, are attachable so that operation of the handle grip effects, depending on the direction of its rotation, the meshing of the teeth of the conical end of the handle grip alternatively individually with one toothed sector or the other, of the two additional toothed sectors for alternatively individually controlling accelerating or braking operation of the motorcycle.

2 Claims, 1 Drawing Figure

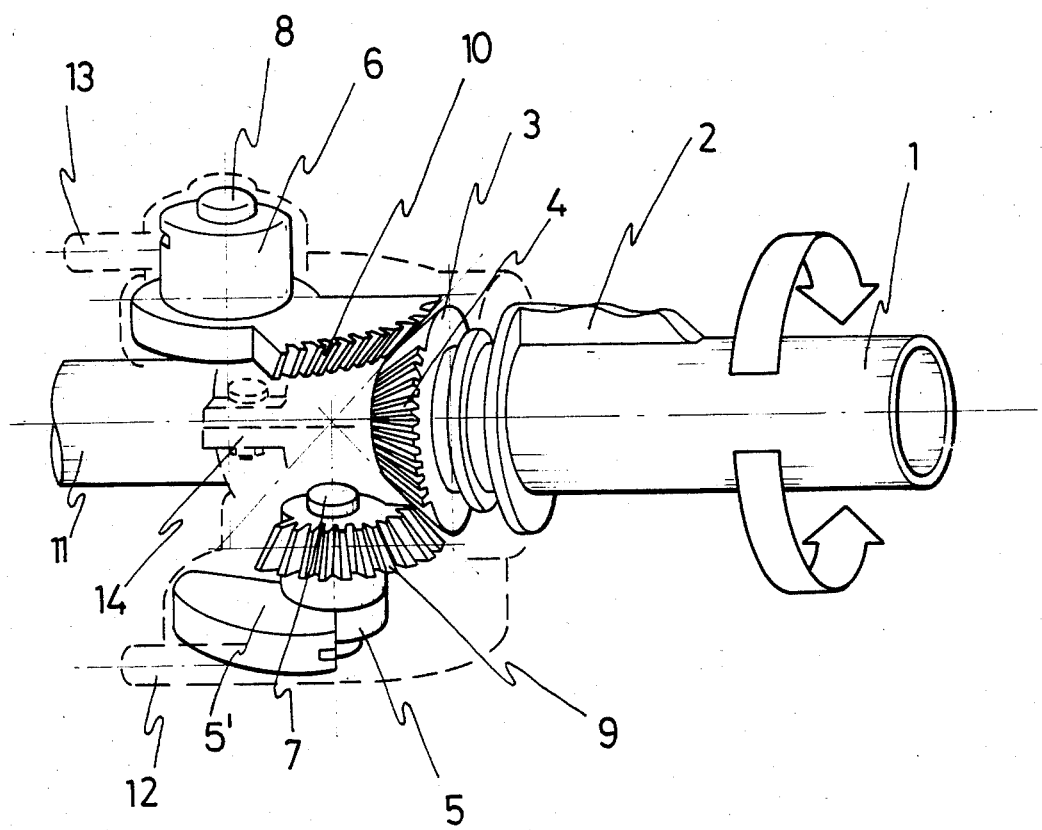

INTEGRAL ACCELERATOR-BRAKE CONTROL FOR MOTORCYCLES

INTEGRAL ACCELERATOR-BRAKE CONTROL FOR MOTORCYCLES

FIELD AND BACKGROUND OF THE INVENTION

The present invention refers to an integral control, whereby a motorcycle engine can be accelerated and its brake can be applied.

SUMMARY OF THE INVENTION

Since the integral control of the present invention is, in principle, designed for use in moto-cross competitions, its functionality is to obtain a higher speed in the braking-accelerating changes and a greater safety, since it is capable of better resisting the charges or forces produced during driving.

Thus, the handle grip of the conventional accelerator is, according to the present invention, proportioned with a functional structure and is provided with an end cone in which is disposed a bevel gearing sector coinciding alternatively individually with each of two toothed sectors located, respectively, in corresponding cylinders in which the accelerator and the brake cables are coiled, so that when the handle grip is turned in one direction its end cone gearing sector meshes individually only with the teeth of the accelerator cylinder toothed sector and if turned in the other direction, alternatively it meshes individually only with the teeth of the brake cylinder toothed sector, the respective cylinders concordantly otherwise being free in each case, since the smooth portion of the handle grip end cone coincides with the gear or toothed sector corresponding to the cylinder not then being meshed with the end cone gearing sector.

BRIED DESCRIPTION OF THE DRAWING

For a better understanding of the foregoing, this specification is accompanied by a drawing, forming an integral part thereof, illustrating a perspective view of a practical embodiment of the object of the invention.

DESCRIPTION OF THE PREFERRED EMBODIMENT

As shown, the drawing illustrates the handle grip 1 provided with an anatomically shaped projection 2 at the coupling zone of the index and middle fingers of a hand, to achieve a better lever arm gripping action. The arrows indicate the two alternative direction turning movements of the handle grip 1.

The handle grip ends in a conical body 3, a sector 4 of which has teeth along approximately one-third of its perimeter, the remainder being smooth.

Facing the conical body or end cone 3, are placed two cylinders 5 and 6, one above and the other below, coupled so that they are securely fixed to the handlebar 11 through a support structure 14. Each of the cylinders rotates on corresponding vertical shafts 7 and 8 and the permieter of each such cylinder is provided with a corresponding toothed sector 9 and 10, disposed tangentially to the cone 3 of the handle grip, with whose teeth they alternatively individually mesh, depending on the direction of turning of said handle grip.

The accelerator cable is hooked to the curved sector cable drum extension portion 5' of the cylinder 5 and the brake cable to the cylinder 6, protruding through the housings or cable guides 12 and 13, respectively.

The arrangement of the described elements determine a simplicity in the alternative operation of the accelerator and the brake. Whilst applying one, the other is free. The handling ease permits one or the other to be applied in fractions of a second.

The main advantages of the arrangement according to the present invention are that the operator is enabled to obtain a higher speed in the braking-accelerating changes, and a greater safety in driving since the handle grip is always held with the hands and it can better resist the charges or forces to which the handlebar is subjected, thereby eliminating the projecting parts of conventional brake operating levers.

I claim:

1. Integral accelerator-brake control arrangement for a motorcycle comprising handle bar support means, a handle grip rotatable back and forth on the support means about an integrally formed handle axis and having a conical end including a handle grip toothed sector containing teeth along approximately one-third of the perimeter of the conical end, the remainder of said perimeter being substantially smooth, and two substantially diametrically opposite cylinders located tangentially to the conical end of the handle grip and rotatable back and forth on the support means about corresponding axes of rotation substantially perpendicular to the handle axis, one of the cylinders being an accelerator cable cylinder adapted for mounting connection of an accelerator operating cable thereto and being provided with an accelerator toothed sector, and the other cylinder being a brake cable cylinder adapted for mounting connection of a brake operating cable thereto and being provided with a brake toothed sector, the accelerator toothed sector and brake toothed sector being arranged in substantially diametrically opposite spaced relation to each other and in tangential relation to the handle grip conical end toothed sector, such that upon rotation of the handle grip in one direction the conical end toothed sector meshes individually only with the accelerator toothed sector for individually controlling accelerating operation, and alternatively upon rotation of the handle grip in an opposite direction the conical end toothed sector meshes individually only with the brake toothed sector for alternatively individually controlling braking operation.

2. Arrangement of claim 1 wherein the handle grip is provided with an anatomically shaped radial extension for increasing manual leverage during rotation of the handle grip.

* * * * *